(12) United States Patent
Hu et al.

(10) Patent No.: US 11,494,129 B2
(45) Date of Patent: Nov. 8, 2022

(54) METHOD, ELECTRONIC DEVICE AND COMPUTER PROGRAM PRODUCT FOR ACCESSING STORAGE SYSTEM

(71) Applicant: EMC IP Holding Company LLC, Hopkinton, MA (US)

(72) Inventors: Jun Hu, Shanghai (CN); Wai C. Yim, Merrimack, NH (US); Yang Liu, Shanghai (CN); Fengwei Fu, Shanghai (CN); Yinlong Lu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/198,554

(22) Filed: Mar. 11, 2021

(65) Prior Publication Data
US 2022/0179591 A1 Jun. 9, 2022

(30) Foreign Application Priority Data
Dec. 4, 2020 (CN) .......................... 202011410723.0

(51) Int. Cl.
*G06F 3/06* (2006.01)
(52) U.S. Cl.
CPC .......... *G06F 3/0665* (2013.01); *G06F 3/0607* (2013.01); *G06F 3/0631* (2013.01); *G06F 3/0659* (2013.01); *G06F 3/0683* (2013.01)
(58) Field of Classification Search
CPC ........ G06F 3/067; G06F 3/061; G06F 3/0664; G06F 13/4022; G06F 13/4265; G06F 2009/45579; G06F 2009/45595; G06F 3/0665; G06F 3/0685; G06F 9/45558; G06F 13/1642; G06F 9/45541; G06F 3/0679; G06F 3/0659; G06F 13/28; G06F 13/385; G06F 13/4282; G06F 2213/0026; G06F 3/0613; G06F 9/455; G06F 13/1673; G06F 13/4068; G06F 2209/5011; G06F 3/0611; G06F 3/0622; G06F 3/0635; G06F 3/0689; G06F 9/5016; G06F 11/1448; G06F 11/1469; G06F 11/2071; G06F 11/2087; G06F 13/1668; G06F 13/387;
(Continued)

(56) References Cited

U.S. PATENT DOCUMENTS

8,954,383 B1 2/2015 Vempati et al.
10,324,834 B2 6/2019 Seo et al.
(Continued)

*Primary Examiner* — Yong J Choe
(74) *Attorney, Agent, or Firm* — BainwoodHuang (57) ABSTRACT

Techniques for accessing a storage system involve: based on a detection that a first host configured to use a first protocol to access a storage system is connected to the storage system, determining a source logical storage space from a second group of logical storage spaces associated with a second protocol. The second protocol is different from the first protocol. The techniques further involve: determining, from a first group of logical storage spaces associated with the first protocol, a target logical storage space to which the source logical storage space is mapped. The techniques further involve: allocating the target logical storage space to the first host, so that the first host accesses the storage system via the target logical storage space. Accordingly, suitable protocols can be flexibly used to access the storage system without cumbersome and time-consuming operations.

20 Claims, 5 Drawing Sheets

(58) Field of Classification Search
CPC ............. G06F 13/4027; G06F 13/4221; G06F 13/4234; G06F 2201/84; G06F 2213/0036; G06F 3/0604; G06F 3/0647
See application file for complete search history.

(56) References Cited

U.S. PATENT DOCUMENTS

| | | |
|---|---|---|
| 11,061,770 B1 | 7/2021 | Patel et al. |
| 2021/0223959 A1 | 7/2021 | Kumar et al. |
| 2021/0406136 A1* | 12/2021 | Venkatesh ............ G06F 11/1451 |
| 2021/0406241 A1 | 12/2021 | Patel et al. |

* cited by examiner

METHOD, ELECTRONIC DEVICE AND COMPUTER PROGRAM PRODUCT FOR ACCESSING STORAGE SYSTEM

CROSS-REFERENCE TO RELATED APPLICATION

This application claims priority to Chinese Patent Application No. CN202011410723.0, on file at the China National Intellectual Property Administration (CNIPA), having a filing date of Dec. 4, 2020, and having "METHOD, ELECTRONIC DEVICE AND COMPUTER PROGRAM PRODUCT FOR ACCESSING STORAGE SYSTEM" as a title, the contents and teachings of which are herein incorporated by reference in their entirety.

TECHNICAL FIELD

Embodiments of the present disclosure relate to the field of data processing, and more particularly, to a method, an electronic device, and a computer program product for accessing a storage system.

BACKGROUND

With the advancement of data storage technologies, storage systems can provide a larger storage space and smarter storage management. Currently, storage systems are designed to be simple, high-performance, and economic. Such storage systems can support next-generation storage media, and have an architecture that can expand vertically and horizontally, a flexible consumption model, and a high degree of simplicity. In a storage environment, one or more hosts can be connected to a storage system and can use appropriate protocols to access (e.g., read and write) data in the storage system. With the rapid development of information technologies, new protocols based on new technologies have increased the speed of access to a storage system. Therefore, it is desirable to use a new protocol to access a storage system.

SUMMARY OF THE INVENTION

The embodiments of the present disclosure provide a solution for accessing a storage system.

In a first aspect of the present disclosure, a method for accessing a storage system is provided. The method includes: based on a detection that a first host configured to use a first protocol to access a storage system is connected to the storage system, determining a source logical storage space from a second group of logical storage spaces associated with a second protocol. The second protocol is different from the first protocol. The method further includes: determining, from a first group of logical storage spaces associated with the first protocol, a target logical storage space to which the source logical storage space is mapped. The method further includes: allocating the target logical storage space to the first host, so that the first host accesses the storage system via the target logical storage space.

In a second aspect of the present disclosure, an electronic device is provided. The electronic device includes a processor and a memory that is coupled to the processor and has instructions stored therein. The instructions, when executed by the processor, cause the device to execute actions. The actions include: based on a detection that a first host configured to use a first protocol to access a storage system is connected to the storage system, determining a source logical storage space from a second group of logical storage spaces associated with a second protocol. The second protocol is different from the first protocol. The actions further include: determining, from a first group of logical storage spaces associated with the first protocol, a target logical storage space to which the source logical storage space is mapped. The actions further include: allocating the target logical storage space to the first host, so that the first host accesses the storage system via the target logical storage space.

In a third aspect of the present disclosure, a computer program product is provided. The computer program product is tangibly stored on a computer-readable medium and includes machine-executable instructions. The machine-executable instructions, when executed, cause a machine to perform the method according to the first aspect.

The Summary of the Invention section is provided to introduce the selection of concepts in a simplified form, which will be further described in the Detailed Description below. The Summary of the Invention section is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments shown in the accompanying drawings. Although preferred embodiments of the present disclosure are shown in the accompanying drawings, it should be understood that these embodiments are described merely to enable those skilled in the art to better understand and then implement the present disclosure, and do not limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," etc. may refer to different or the same objects. Other explicit and implicit definitions may also be included below.

As mentioned briefly above, a host can use an appropriate protocol to access a storage system. The small computer system interface (SCSI) protocol is a conventional protocol. A host that uses the SCSI protocol to access a storage system is also referred to as a "SCSI host." The SCSI host can access a storage system through front-end protocols such as Internet SCSI (iSCSI) and fibre channels.

The non-volatile memory host controller interface specification (NVMe) protocol is a new protocol that can achieve an access performance superior to that of the SCSI protocol. A host that uses the NVMe protocol to access a storage system is also referred to as an "NVMe host." The NVMe over Fabric (NVMeoF) protocol has been proposed to realize the expansion of NVMe on the peripheral component interconnect express standard (PCIe) bus. The NVMe host can access a storage system by using the NVMeoF protocol over different transport layers such as fibre channels, remote direct memory storage (RDMA), and transmission control protocol (TCP) connections.

As a new access protocol for next-generation storage, NVMeoF is a promising technology. Although conventional SCSI hosts still dominate, more and more users consider switching, in whole or in part, the access to a storage system using the SCSI protocol (also referred to as "SCSI access") to the access to the storage system using NVMeoF (also referred to as "NVMeoF access"), to increase the speed of access to the storage system.

However, in current solutions, protocol stacks of the SCSI protocol and the NVMeoF protocol are separated, which makes it difficult for users to set up a new NVMeoF host to replace the existing SCSI protocol. To this end, users need to duplicate data of a logical unit number (LUN) under the SCSI protocol from a SCSI-based storage array to an NVMeoF-based storage array. Such duplication involves access to dozens or even hundreds of LUNs and long-term duplication of LUN data. Therefore, this solution is cumbersome, error-prone, and very expensive. In addition, after duplication, existing SCSI-based infrastructures cannot be fully utilized, either.

The embodiments of the present disclosure propose a solution for accessing a storage system to solve one or more of the above problems and other potential problems. In this solution, if it is detected at a storage system that a first host configured to use a first protocol to access the storage system is connected to the storage system, one or more source logical storage spaces are determined from a second group of logical storage spaces associated with a second protocol. The second protocol is different from the first protocol. Next, a target logical storage space to which the source logical storage space is mapped is determined from a first group of logical storage spaces associated with the first protocol. Then, the determined target logical storage space is allocated to the first host, so that the first host accesses the storage system via the target logical storage space.

The solution proposed here supports the use of dual protocols or even multiple protocols to access a storage system. In this solution, the process of switching, in whole or in part, from using one protocol to access a storage system to using another protocol to access the storage system does not involve duplication and substantial migration of data, thereby reducing workloads of data paths and saving time and storage system resources. In addition, this process does not involve cumbersome operations from users, thereby reducing manual errors. In this way, suitable protocols can be flexibly used to access a storage system without cumbersome and time-consuming operations.

The example embodiments of the present disclosure will be described in detail below in conjunction with the accompanying drawings.

Figure 1:
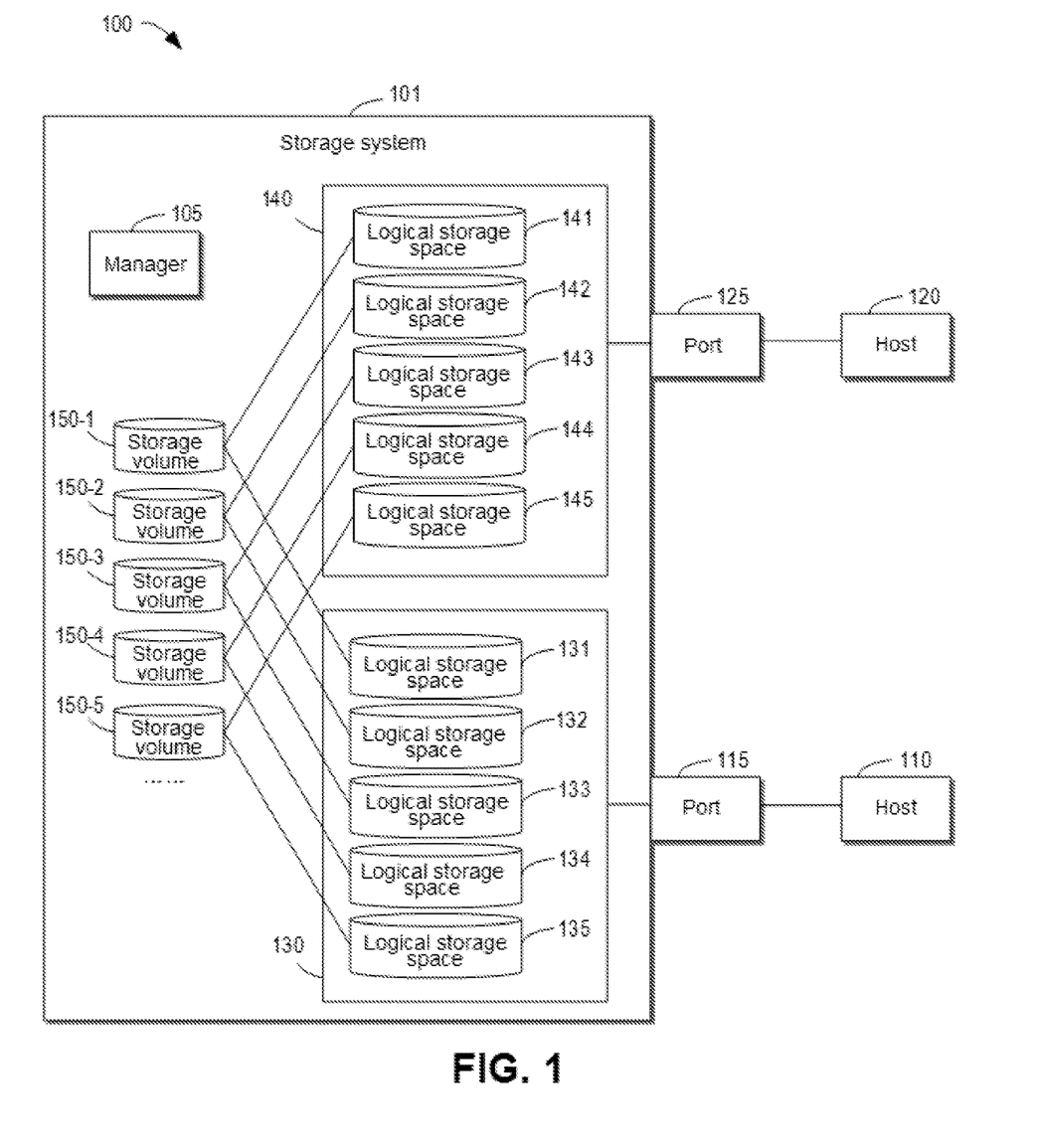
FIG. 1 shows a schematic diagram of an example environment in which an embodiment of the present disclosure may be implemented.

FIG. 1 shows a schematic diagram of example environment 100 in which an embodiment of the present disclosure can be implemented. As shown in FIG. 1, environment 100 generally includes storage system 101, host 110, and host 120. It should be understood that the architecture and functions of environment 100 are described for illustrative purposes only, and do not imply any limitation to the scope of the present disclosure. The embodiments of the present disclosure may also be applied to environments involving data protection systems and having different structures and/or functions.

As shown in FIG. 1, host 110 and host 120 can access storage system 101. For example, host 110 and host 120 can write data to storage system 101 or read data from storage system 101. Host 110 and host 120 can access storage system 101 through corresponding ports connected to storage system 101. In the example of FIG. 1, storage system 101 is shown to have port 115 and port 125. For example, an initiator (not shown) of host 120 may be connected to port 125 of storage system 101, so that host 120 may access storage system 101 via a path from the initiator to port 125. Similarly, an initiator (not shown) of host 110 may be connected to port 115 of storage system 101, so that host 110 may access storage system 101 via a path from the initiator to port 115.

Host 110 and host 120 may use different protocols to access storage system 101. In some embodiments, host 110 may be configured to use the NVMeoF protocol to access storage system 101, and host 120 may be configured to use the SCSI protocol to access storage system 101. Therefore, in this embodiment, host 110 may also be referred to as an NVMe host, port 115 may also be referred to as an NVMe port, host 120 may also be referred to as a SCSI host, and port 125 may also be referred to as a SCSI port. In some other embodiments, host 110 and host 120 may use other suitable protocols to access storage system 101. Here, host 110 may also be referred to as a "first host," and the protocol used by host 110 may also be referred to as a "first protocol." Similarly, host 120 may also be referred to as a "second host," and the protocol used by host 120 may also be referred to as a "second protocol." Since storage system 101 supports dual-protocol access, a unified protocol stack for the first protocol and the second protocol may be implemented in storage system 101.

Storage system 101 may be constructed based on one or more storage disks or storage nodes. The storage disks for constructing storage system 101 may be various types of storage disks, which include, but are not limited to, solid-state drives (SSDs), magnetic disks, optical discs, and the like. A logical storage unit can be created in storage system 101 to manage such storage disks. In the example of FIG. 1, storage system 101 is shown to manage such storage disks by creating multiple storage volumes 150-1, 150-2, 150-3, 150-4, and 150-5 (for ease of description, referred to collectively or individually herein as storage volume 150). A storage volume (or referred to as a volume) is a logical linear capacity space that is used to retain data along with defined service level protocols and data services (such as snapshots). Users of storage system 101 can allocate and manage storage volumes according to business requirements and from the perspectives of capacity, performance, functions, etc., with no need for any knowledge of or binding to access protocols at the front end, e.g., the SCSI protocol or the NVMeoF protocol.

Logical storage units such as storage volume 150 are invisible to host 110 and host 120 at the front end and the protocols used by them. For this reason, when creating storage volume 150, a logical storage space corresponding to storage volume 150 can be created for access by the hosts.

As shown in FIG. 1, a group of logical storage spaces 130 associated with the first protocol may be created, which is also referred to herein as the first group of logical storage spaces 130. The first group of logical storage spaces 130 includes logical storage spaces 131, 132, 133, 134, and 135 that correspond to storage volumes 150-1, 150-2, 150-3, 150-4, and 150-5, respectively. The first group of logical storage spaces 130 are accessible to host 110 or other hosts using the first protocol. That is, when host 110 is connected to storage system 101, storage system 101 may allocate one or more of logical storage spaces 131, 132, 133, 134, and 135 to host 110, as will be described in detail below.

Another group of logical storage spaces 140 associated with the second protocol may be created, which is also referred to herein as the second group of logical storage spaces 140. The second group of logical storage spaces 140 includes logical storage spaces 141, 142, 143, 144, and 145 that correspond to storage volumes 150-1, 150-2, 150-3, 150-4, and 150-5, respectively. The second group of logical storage spaces 140 are accessible to host 120 or other hosts using the second protocol. That is, when host 120 is connected to storage system 101, storage system 101 may allocate one or more of logical storage spaces 141, 142, 143, 144, and 145 to host 120.

Since the first protocol is different from the second protocol, the first group of logical storage spaces 130 and the second group of logical storage spaces 140 may be different types of logical storage spaces. In an embodiment where the first protocol is the NVMeoF protocol and the second protocol is the SCSI protocol, the first group of logical storage spaces 130 may be a group of namespaces (NSs). For example, logical storage spaces 131, 132, 133, 134, and 135 may be NS1, NS5, NS7, NS17, and NS23, respectively. The second group of logical storage spaces 140 may be a group of LUNs. For example, logical storage spaces 141, 142, 143, 144, and 145 may be LUN0, LUN1, LUN2, LUN3, and LUN4, respectively.

It can be understood that the creation of storage volumes and logical storage spaces described above may be an offline process, that is, it may be implemented without a host connected to storage system 101. In addition, the numbers of storage volumes, the first group of logical storage spaces, and the second group of logical storage spaces shown in FIG. 1 are only by way of example.

Manager 105 in storage system 101 is used to manage data access to storage system 101 by hosts (e.g., hosts 110 and 120). Manager 105 can also be used to manage and maintain storage volumes 150, the logical storage spaces, a correspondence between the logical storage spaces and storage volumes 150, a mapping between the first group of logical storage spaces 130 and the second group of logical storage spaces 140, etc. in storage system 101.

It should be understood that although only two hosts 110 and 120 are shown in FIG. 1, more hosts can access storage system 101. In addition to the elements shown in the figure, other elements may also exist in environment 100. In addition, although host 110 and host 120 are shown separately, host 110 and host 120 may be implemented at the same physical device.

Figure 2:
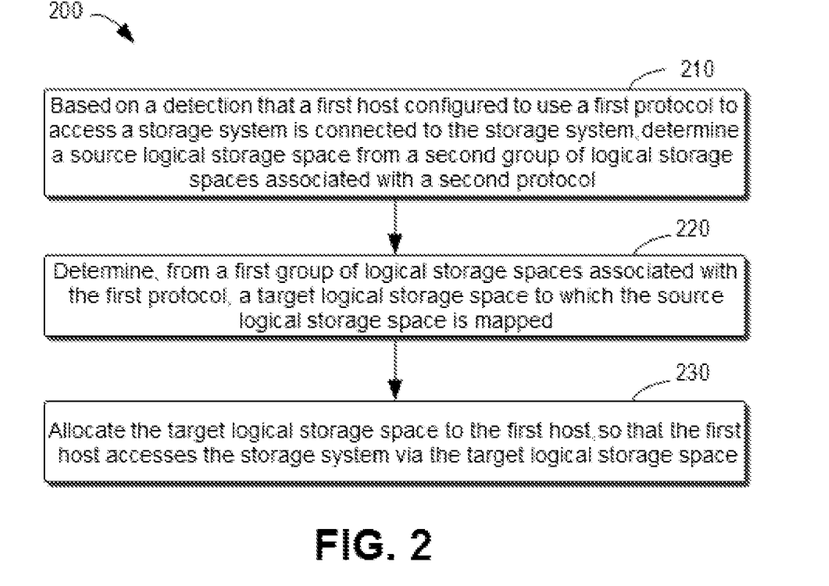
FIG. 2 shows a flowchart of an example method for accessing a storage system according to an embodiment of the present disclosure.

FIG. 2 shows a flowchart of example method 200 for accessing a storage system according to an embodiment of the present disclosure. Method 200 may be executed, for example, by manager 105 shown in FIG. 1. It should be understood that method 200 may further include additional actions not shown and/or may omit actions shown, and the scope of the present disclosure is not limited in this regard. Method 200 is described in detail below in conjunction with FIG. 1.

As mentioned above, storage volumes 150 and the corresponding first group of logical storage spaces 130 and second group of logical storage spaces 140 shown in FIG. 1 can be created offline. In operation, initially, host 120 configured to use the second protocol to access storage system 101 is connected to storage system 101 through port 125. Correspondingly, manager 105 allocates one or more logical storage spaces in the second group of logical storage spaces 140 associated with the second protocol to host 120. For example, in an embodiment where the second protocol is the SCSI protocol, manager 105 may allocate LUN0, LUN1, LUN2, LUN3, LUN4, etc. to host 120. Thus, host 120 can access storage system 101 via LUN0, LUN1, LUN2, LUN3, and LUN4 and using the SCSI protocol.

Host 101 configured to use the first protocol to access storage system 101 is connected to storage system 101 through port 115. For example, a host bus adapter (HBA) supporting the first protocol may be added at a physical device that implements host 110. Then, host 110 can be connected to storage system 101 by using an initiator (not shown). The user may wish to switch or migrate, at least in part, the access to storage system 101 using the second protocol to the access to storage system 101 using the first protocol, which is also referred to as migration of access between protocols. The following is a detailed description of how to implement this kind of access migration between protocols.

In block 210, manager 105 determines one or more source logical storage spaces from the second group of logical storage spaces 140 associated with the second protocol based on a detection that host 110 is connected to storage system 101. The source logical storage space described here refers to a logical storage space for which access migration will be performed. For example, in an embodiment where the second protocol is the SCSI protocol, manager 105 may determine one or more source LUNs for migration from LUN0, LUN1, LUN2, LUN3, LUN4, etc.

In some embodiments, manager 105 may determine the source logical storage space based on a predetermined configuration. As an example, when it is detected that host 110 is connected to storage system 101, manager 105 may determine all the logical storage spaces in the first group of logical storage spaces 140 associated with the second protocol as the source logical spaces for migration, so as to achieve complete migration of access. As another example, when it is detected that host 110 is connected to storage system 101, manager 105 may determine a predetermined number of logical storage spaces in the first group of logical storage spaces 140 as the source logical storage spaces for migration, so as to achieve partial migration of access.

In some embodiments, manager 105 may determine the source logical storage space for migration based on a user input or a user selection. For example, when it is detected that host 110 is connected to storage system 101, manager 105 may provide a user interface to a user, and receive a user input or a user selection for storage system 101.

In one embodiment, complete migration of access can be supported. If the received user input specifies host 120, manager 105 may determine all the logical storage spaces allocated to host 120 in the second group of logical storage spaces 140 as the source logical storage spaces for migration. In this embodiment, the user only needs to specify host 120 by inputting or selecting identification information (e.g., ID) of host 120 in the user interface. For example, in an embodiment where the first protocol is the NVMeoF protocol and the second protocol is the SCSI protocol, the user can input a SCSI host ID of host 120 in the user interface. Additionally, the user can also input an NVMeoF qualified name (NQN) of host 110 in the user interface. Thus, manager 105 can determine all LUNs allocated to host 120 as the source logical storage spaces for migration to host 110.

In one embodiment, partial migration of access may be supported. The user can select, in the user interface, the logical storage space for migration from the second group of logical storage spaces 140. In other words, the user selection can specify one or more logical storage spaces in the second group of logical storage spaces 140. Correspondingly, manager 105 may determine the logical storage space specified by the user selection as the logical storage space for migration. For example, the user selection can specify logical storage spaces 142, 144, and 145.

The partial migration supported by this embodiment can be used to protect and be compatible with existing storage systems. For example, there may be situations where booting from a storage area network (SAN) using a second protocol (e.g., the SCSI protocol) is supported, while booting using a first protocol (e.g., the NVMeoF protocol) is undefined or unsupported. In this case, the user can select, from the first group of logical storage spaces 140, those logical storage spaces (e.g., LUNs) that are not used for booting for migration. In this way, those logical storage spaces used for booting in the first group of logical storage spaces 140 will be maintained.

Still refer to FIG. 2. In block 220, manager 105 determines a target logical storage space to which the source logical storage space is mapped from the first group of logical storage spaces 130 associated with the first protocol. Manager 105 may determine the target logical storage space based on a mapping between the first group of logical storage spaces 130 and the second group of logical storage spaces 140. In the embodiment of the present disclosure, such mapping may be maintained or determined by storage system 101 without a user input or specification. Logical storage spaces corresponding to the same storage unit (e.g., storage volume 150) at the backend may be mapped to each other. For example, in an embodiment where the first protocol is the NVMeoF protocol and the second protocol is the SCSI protocol, LUNs and NSs corresponding to the same storage volume 150 may be mapped to each other.

In some embodiments, manager 105 may generate a mapping between the first group of logical storage spaces 130 and the second group of logical storage spaces 140 when the first group of logical storage spaces 130 and the second group of logical storage spaces 140 are created offline. Then, manager 105 may determine the target logical storage space based on the maintained mapping after determining the source logical storage space. In the example of FIG. 1, the maintained mapping may indicate that logical storage spaces 141, 142, 143, 144, and 145 are mapped to logical storage spaces 131, 132, 133, 145, and 135, respectively. For example, if logical storage space 142 is determined as the source logical storage space for migration, manager 105 may determine logical storage space 132 as the target logical storage space for migration.

In some embodiments, manager 105 may determine the target logical storage space for migration based on a correspondence between the first group of logical storage spaces 130 and storage volume 150 and a correspondence between the second group of logical storage spaces 140 and storage volume 150. Specifically, manager 105 may determine, in storage system 101, the storage volume corresponding to the source logical storage space. Manager 105 may further determine the logical storage space corresponding to the storage volume in the first group of logical storage spaces 130 as the target logical storage space. As an example, if logical storage space 142 is determined as the source logical storage space for migration, manager 105 may determine storage volume 150-2 corresponding to logical storage space 142, and may determine that logical storage space 132 corresponds to storage volume 150-2 in the first group of logical storage spaces 130. Thus, logical storage space 132 may be determined as the target logical storage space for migration.

In block 230, manager 105 allocates the target logical storage space to first host 110, so that first host 110 accesses storage system 101 via the target logical storage space. According to an implementation of storage system 101, manager 105 can use any suitable manner to allocate the target logical storage space to first host 110 for first host 110 to access.

In some embodiments, manager 105 may generate identification information of the target logical storage space (also referred to as "target identification information") based on identification information of the source logical storage space (also referred to as "source identification information"). Manager 105 may use any suitable algorithm to generate the target identification information from the source identification information, and the scope of the present disclosure is not limited in this respect. Then, manager 105 may associate the target identification information of the target logical storage space with the identification information of host 110 (also referred to as "host identification information"). The source identification information and the target identification information may be any information that can uniquely identify a corresponding logical storage unit, such as a unit identifier and a unit name. The host identification information may be any information that can uniquely identify host 110, such as a host name, a host identifier, and so on.

In some embodiments, manager 105 may also deallocate the source logical storage space from host 120. Therefore, host 120 will not be able to access storage system 101 via the source logical storage space. For example, if host 120 will not use the second protocol to access the source logical storage space after the migration, manager 105 may deallocate the source logical storage space from host 120.

Figure 3:
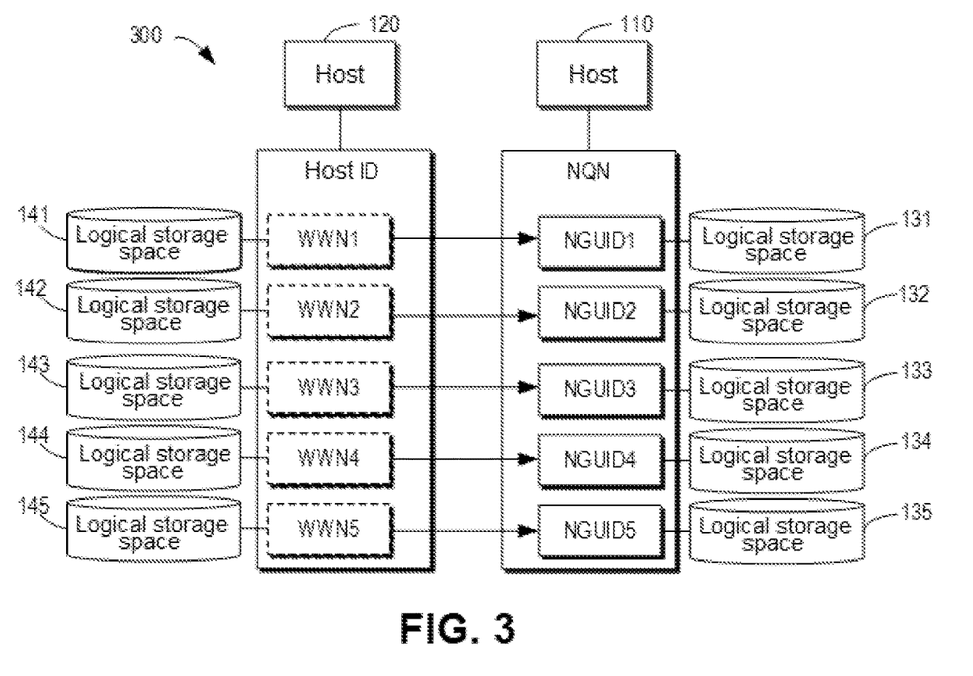
FIG. 3 shows a schematic diagram of the allocation and deallocation of a logical storage space according to some embodiments of the present disclosure.
Figure 4:
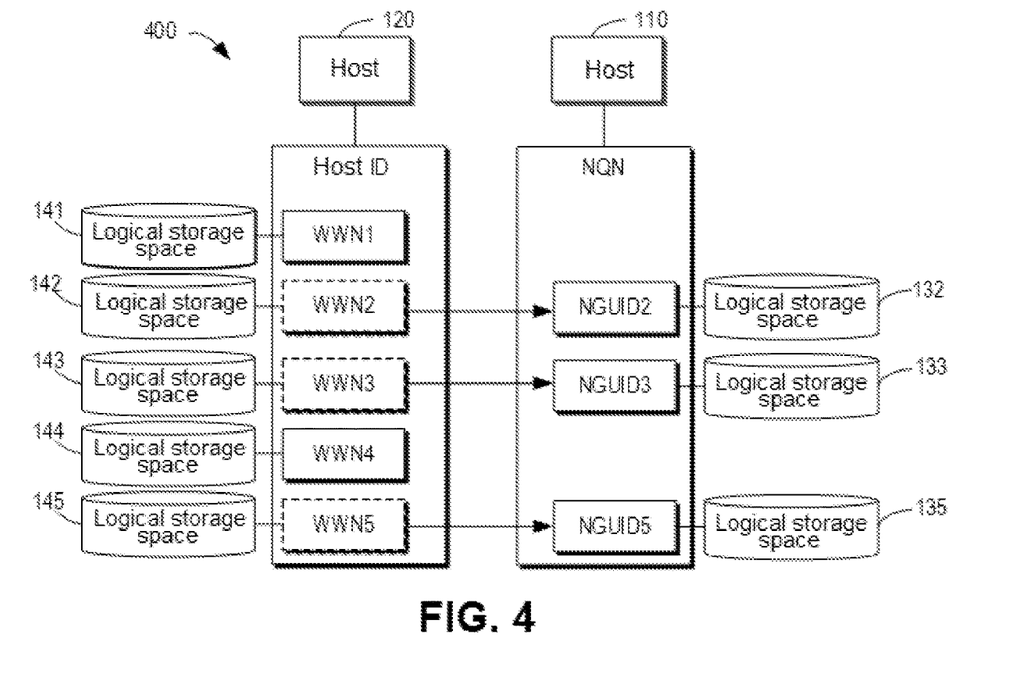
FIG. 4 shows a schematic diagram of the allocation and deallocation of a logical storage space according to some embodiments of the present disclosure.

The allocation of the target logical storage space and the deallocation of the source logical storage space will be described below with reference to FIGS. 3 and 4. FIG. 3 shows schematic diagram 300 of the allocation and deallocation of a logical storage space according to some embodiments of the present disclosure. FIG. 4 shows schematic diagram 400 of the allocation and deallocation of a logical storage space according to some embodiments of the present disclosure. For illustrative purposes only and not intended to limit the scope of the present disclosure, in the examples of FIGS. 3 and 4, the first protocol is the NVMeoF protocol and the second protocol is the SCSI protocol. Correspondingly, logical storage spaces 141, 142, 143, 144, and 145 may be LUNs, such as LUN0, LUN1, LUN2, LUN3, and LUN4. Logical storage spaces 131, 132, 133, 134, and 135 may be NSs, such as NS1, NS5, NS7, NS17, and NS23. As shown in FIGS. 3 and 4, host 120 may have a host ID, and host 110 may have an NQN. The NQN of host 120 may correspond to an initiator used by host 120 to connect to storage system 101.

In this example, the identification information of the first group of logical storage spaces 140 may be a world wide name (WWN). As shown in FIGS. 3 and 4, logical storage spaces 141, 142, 143, 144, and 145 may respectively have WWN1, WWN2, WWN3, WWN4, and WWN5. Initially, logical storage spaces 141, 142, 143, 144, and 145 may be allocated to host 120. WWN1, WWN2, WWN3, WWN4, and WWN5 may be associated with the host ID of host 120.

FIG. 3 shows a scenario of complete migration. That is, logical storage spaces 141, 142, 143, 144, and 145 are all determined as source logical storage spaces. Logical storage spaces 131, 132, 133, 134, and 135 are correspondingly determined as target logical storage spaces. Manager 105 may generate a namespace global unique identifier (NGUID) of a corresponding target logical storage space based on the WWN of each of logical storage spaces 141, 142, 143, 144, and 145. In the example of FIG. 3, manager 105 may generate NGUID1 of logical storage space 131 based on WWN1 of logical storage space 141 and associate NGUID1 with the NQN of host 110. Similarly, NGUID2 of logical storage space 132, NGUID3 of logical storage space 133, NGUID4 of logical storage space 134, and NGUID5 of logical storage space 135 are respectively generated and associated with the NQN of host 110. In this way, logical storage spaces 131, 132, 133, 134, and 135, such as NS1, NS5, NS7, NS17, and NS23, can be allocated to host 110.

As indicated by the dashed box in FIG. 3, the WWN of each of logical storage spaces 141, 142, 143, 144, and 145 is disassociated from the host ID of host 120. In this way, logical storage spaces 141, 142, 143, 144, and 145, such as LUN0, LUN1, LUN2, LUN3, and LUN4, can be deallocated from host 120.

After implementing the example migration shown in FIG. 3, host 110 can access storage system 101 via logical storage spaces 131, 132, 133, 134, and 135 and using the first protocol. At the same time, host 120 will be prohibited from accessing storage system 101 via logical storage spaces 141, 142, 143, 144, and 145.

Different from FIG. 3, FIG. 4 shows a scenario of partial migration. In the example of FIG. 4, logical storage spaces 142, 143, and 145 are determined as the source logical storage spaces. Logical storage spaces 132, 133, and 135 are correspondingly determined as target logical storage spaces. Manager 105 may generate a NGUID of a corresponding target logical storage space based on the WWN of each of logical storage spaces 142, 143, and 145. In the example of FIG. 4, manager 105 may generate NGUID2 of logical storage space 132 based on WWN2 of logical storage space 142 and associate NGUID2 with the NQN of host 110. Similarly, NGUID3 of logical storage space 133 and NGUID5 of logical storage space 135 are respectively generated and associated with the NQN of host 110. In this way, logical storage spaces 132, 133, and 135, such as NS5, NS7, and NS23, can be allocated to host 110.

As indicated by the dashed box in FIG. 4, the WWN of each of logical storage spaces 142, 143, and 145 is disassociated from the host ID of host 120. In this way, logical storage spaces 142, 143, and 145, such as LUN1, LUN2, and LUN4, can be deallocated from host 120.

After the example migration shown in FIG. 4 is implemented, host 110 can access storage system 101 via logical storage spaces 132, 133, and 135. Host 120 will be prohibited from accessing storage system 101 via logical storage spaces 142, 143, and 145. At the same time, host 120 can still access storage system 101 via logical storage spaces 141 and 144.

The example embodiment described above involves two protocols. It can be understood that the embodiments of the present disclosure can also be implemented to support accessing a storage system using three or more protocols.

It can be seen from the above description that the embodiments of the present disclosure propose a solution for accessing a storage system. The solution supports the use of dual protocols or even multiple protocols to access a storage system. In this solution, the process of switching from using one protocol to access a storage system to using another protocol to access the storage system does not involve duplication and substantial migration of data, thereby reducing workloads of data paths and saving time and storage system resources. In addition, this process does not involve cumbersome operations from users, thereby reducing manual errors. In this way, suitable protocols can be flexibly used to access a storage system without cumbersome and time-consuming operations.

Figure 5:
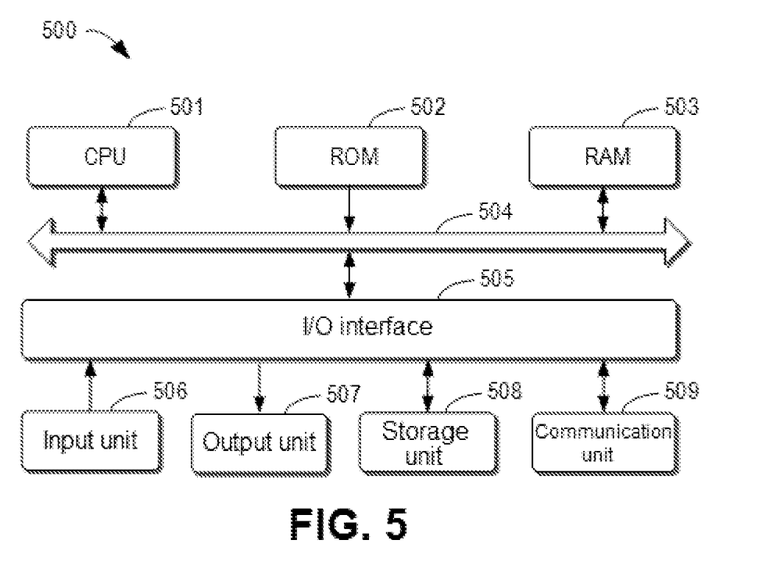
FIG. 5 shows a block diagram of an example device that may be configured to implement an embodiment of the present disclosure.

FIG. 5 shows a schematic block diagram of example device 500 that can be used to implement the embodiments of the content of the present disclosure. For example, storage manager 120 as shown in FIG. 1 may be implemented by device 500. As shown in FIG. 5, device 500 includes Central Processing Unit (CPU) 501 that may execute various appropriate actions and processing in accordance with computer program instructions stored in read-only memory (ROM) 502 or computer program instructions loaded onto random access memory (RAM) 503 from storage unit 508. In RAM 503, various programs and data required for the operation of device 500 may also be stored. CPU 501, ROM 502, and RAM 503 are connected to each other through bus 504. Input/output (I/O) interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices via a computer network such as the Internet and/or various telecommunication networks.

Various processes and processing described above, for example, method 200, may be performed by processing unit

501. For example, in some embodiments, method 200 may be implemented as a computer software program that is tangibly included in a machine-readable medium such as storage unit 508. In some embodiments, part or all of the computer program may be loaded and/or installed onto device 500 via ROM 502 and/or communication unit 509. When the computer program is loaded into RAM 503 and executed by CPU 501, one or more actions of method 200 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any appropriate combination thereof. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any type of networks, including a local area network (LAN) or a wide area network (WAN), or may be connected to an external computer (e.g., connected over the Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of illustrated various embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for accessing a storage system, comprising:
   based on a detection that a first host configured to use a first protocol to access a storage system is connected to the storage system, determining a source logical storage space from a second group of logical storage spaces associated with a second protocol that is different from the first protocol;
   determining, from a first group of logical storage spaces associated with the first protocol, a target logical storage space to which the source logical storage space is mapped; and
   allocating the target logical storage space to the first host, so that the first host accesses the storage system via the target logical storage space;
   wherein determining the target logical storage space to which the source logical storage space is mapped comprises:
   determining, in the storage system, a storage volume corresponding to the source logical storage space; and
   determining a logical storage space corresponding to the storage volume in the first group of logical storage spaces as the target logical storage space.

2. The method according to claim 1, wherein determining the source logical storage space comprises:
   receiving a user input for the storage system; and
   if the user input specifies a second host that uses the second protocol to access the storage system, determining a logical storage space allocated to the second host in the second group of logical storage spaces as the source logical storage space.

3. The method according to claim 1, wherein determining the source logical storage space comprises:
   receiving a user selection for the second group of logical storage spaces; and
   determining a logical storage space specified by the user selection in the second group of logical storage spaces as the source logical storage space.

4. The method according to claim 1, wherein allocating the target logical storage space to the first host comprises:
   generating target identification information of the target logical storage space based on source identification information of the source logical storage space; and
   associating the target identification with host identification information of the first host.

5. The method according to claim 4, wherein the source identification information comprises a world wide name (WWN) of the source logical storage space, the target identification information comprises a namespace global unique identifier (NGUID) of the target logical storage space, and the host identification information comprises a non-volatile memory host controller interface specification qualified name (NQN) of the first host.

6. The method according to claim 1, further comprising:
   deallocating the source logical storage space from the second host, the second host being configured to use the second protocol to access the storage system.

7. The method according to claim 1, wherein the first protocol comprises a non-volatile memory host controller interface specification (NVMe) protocol, and the second protocol comprises a small computer system interface (SCSI) protocol.

8. An electronic device, comprising:
   a processor; and
   a memory coupled to the processor, the memory having instructions stored therein, and the instructions, when executed by the processor, causing the device to execute actions comprising:
   based on a detection that a first host configured to use a first protocol to access a storage system is connected to the storage system, determining a source logical storage space from a second group of logical storage spaces associated with a second protocol that is different from the first protocol;
   determining, from a first group of logical storage spaces associated with the first protocol, a target logical storage space to which the source logical storage space is mapped; and
   allocating the target logical storage space to the first host, so that the first host accesses the storage system via the target logical storage space;
   wherein determining the target logical storage space to which the source logical storage space is mapped comprises:
   determining, in the storage system, a storage volume corresponding to the source logical storage space; and
   determining a logical storage space corresponding to the storage volume in the first group of logical storage spaces as the target logical storage space.

9. The device according to claim 8, wherein determining the source logical storage space comprises:
   receiving a user input for the storage system; and
   if the user input specifies a second host that uses the second protocol to access the storage system, determining a logical storage space allocated to the second host in the second group of logical storage spaces as the source logical storage space.

10. The device according to claim 8, wherein determining the source logical storage space comprises:
    receiving a user selection for the second group of logical storage spaces; and
    determining a logical storage space specified by the user selection in the second group of logical storage spaces as the source logical storage space.

11. The device according to claim 8, wherein allocating the target logical storage space to the first host comprises:
    generating target identification information of the target logical storage space based on source identification information of the source logical storage space; and
    associating the target identification with host identification information of the first host.

12. The device according to claim 11, wherein the source identification information comprises a world wide name (WWN) of the source logical storage space, the target identification information comprises a namespace global unique identifier (NGUID) of the target logical storage space, and the host identification information comprises a non-volatile memory host controller interface specification qualified name (NQN) of the first host.

13. The device according to claim 8, wherein the actions further comprise:
- deallocating the source logical storage space from the second host, the second host being configured to use the second protocol to access the storage system.

14. The device according to claim 8, wherein the first protocol comprises a non-volatile memory host controller interface specification (NVMe) protocol, and the second protocol comprises a small computer system interface (SCSI) protocol.

15. A computer program product having a non-transitory computer readable medium which stores a set of instructions to access a storage system; the set of instructions, when carried out by computerized circuitry, causing the computerized circuitry to perform a method of:
- based on a detection that a first host configured to use a first protocol to access a storage system is connected to the storage system, determining a source logical storage space from a second group of logical storage spaces associated with a second protocol that is different from the first protocol;
- determining, from a first group of logical storage spaces associated with the first protocol, a target logical storage space to which the source logical storage space is mapped; and
- allocating the target logical storage space to the first host, so that the first host accesses the storage system via the target logical storage space;

wherein allocating the target logical storage space to the first host comprises:
- generating target identification information of the target logical storage space based on source identification information of the source logical storage space; and
- associating the target identification with host identification information of the first host.

16. The computer program product according to claim 15, wherein determining the source logical storage space comprises:
- receiving a user input for the storage system; and
- if the user input specifies a second host that uses the second protocol to access the storage system, determining a logical storage space allocated to the second host in the second group of logical storage spaces as the source logical storage space.

17. The computer program product according to claim 15, wherein determining the source logical storage space comprises:
- receiving a user selection for the second group of logical storage spaces; and
- determining a logical storage space specified by the user selection in the second group of logical storage spaces as the source logical storage space.

18. The computer program product according to claim 15, wherein determining the target logical storage space to which the source logical storage space is mapped comprises:
- determining, in the storage system, a storage volume corresponding to the source logical storage space; and
- determining a logical storage space corresponding to the storage volume in the first group of logical storage spaces as the target logical storage space.

19. A method for accessing a storage system, comprising:
- based on a detection that a first host configured to use a first protocol to access a storage system is connected to the storage system, determining a source logical storage space from a second group of logical storage spaces associated with a second protocol that is different from the first protocol;
- determining, from a first group of logical storage spaces associated with the first protocol, a target logical storage space to which the source logical storage space is mapped; and
- allocating the target logical storage space to the first host, so that the first host accesses the storage system via the target logical storage space;

wherein determining the source logical storage space comprises:
- receiving a user input for the storage system; and
- if the user input specifies a second host that uses the second protocol to access the storage system, determining a logical storage space allocated to the second host in the second group of logical storage spaces as the source logical storage space.

20. A method for accessing a storage system, comprising:
- based on a detection that a first host configured to use a first protocol to access a storage system is connected to the storage system, determining a source logical storage space from a second group of logical storage spaces associated with a second protocol that is different from the first protocol;
- determining, from a first group of logical storage spaces associated with the first protocol, a target logical storage space to which the source logical storage space is mapped; and
- allocating the target logical storage space to the first host, so that the first host accesses the storage system via the target logical storage space;

wherein determining the source logical storage space comprises:
- receiving a user selection for the second group of logical storage spaces; and
- determining a logical storage space specified by the user selection in the second group of logical storage spaces as the source logical storage space.

* * * * *